United States Patent
Kang

(10) Patent No.: US 10,147,347 B2
(45) Date of Patent: Dec. 4, 2018

(54) DATA CONVERSION UNIT AND METHOD

(71) Applicant: LG Display Co., Ltd., Seoul (KR)

(72) Inventor: Dong Woo Kang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 6 days.

(21) Appl. No.: 14/885,954

(22) Filed: Oct. 16, 2015

(65) Prior Publication Data

US 2016/0117975 A1 Apr. 28, 2016

(30) Foreign Application Priority Data

Oct. 23, 2014 (KR) .................. 10-2014-0144503

(51) Int. Cl.
| | |
|---|---|
| *G09G 3/20* | (2006.01) |
| *H04N 5/202* | (2006.01) |
| *H04N 9/68* | (2006.01) |
| *H04N 5/20* | (2006.01) |
| *G06T 5/00* | (2006.01) |
| *G09G 3/36* | (2006.01) |

(Continued)

(52) U.S. Cl.
CPC .......... *G09G 3/2074* (2013.01); *G06T 5/009* (2013.01); *G09G 3/2003* (2013.01); *H04N 5/20* (2013.01); *H04N 5/202* (2013.01); *H04N 9/68* (2013.01); *G09G 3/3208* (2013.01); *G09G 3/3607* (2013.01); *G09G 5/10* (2013.01); *G09G 2300/0452* (2013.01); *G09G 2320/0233* (2013.01); *G09G 2320/0271* (2013.01); *G09G 2320/066* (2013.01); *G09G 2320/0673* (2013.01); *G09G 2330/021* (2013.01); *G09G 2340/06* (2013.01); *G09G 2360/16* (2013.01)

(58) Field of Classification Search
CPC ............ G06T 5/009; G09G 2300/0452; G09G 2320/066
See application file for complete search history.

(56) References Cited

U.S. PATENT DOCUMENTS

| | | | |
|---|---|---|---|
| 2006/0256053 A1 | 11/2006 | Baek | |
| 2006/0267921 A1* | 11/2006 | Kim | ..................... G06K 15/005 345/102 |

(Continued)

FOREIGN PATENT DOCUMENTS

| | | |
|---|---|---|
| CN | 101378514 A | 3/2009 |
| KR | 10-2013-0030598 A | 3/2013 |
| KR | 10-2013-0060476 A | 6/2013 |

OTHER PUBLICATIONS

European Patent Office, Search Report and Opinion, European Patent Application No. 15190692.2, dated Feb. 3, 2016, eight pages.

(Continued)

*Primary Examiner* — Chun-Nan Lin
(74) *Attorney, Agent, or Firm* — Fenwick & West LLP

(57) ABSTRACT

A data conversion unit is disclosed which includes: a transformation portion configured to transform R (red), G (green) and B (blue) sub-pixel data signals of input image data into R, G, B and W (white) sub-pixel data signals; and a brightness reinforcement portion configured to adjust brightness of a transformed W sub-pixel data signal included in the transformed R, G, B, and W sub-pixel data signals based on brightness distribution of the input image data.

17 Claims, 6 Drawing Sheets

(51) Int. Cl.
*G09G 3/3208* (2016.01)
*G09G 5/10* (2006.01)

(56) References Cited

U.S. PATENT DOCUMENTS

| | | | |
|---|---|---|---|
| 2007/0132680 A1* | 6/2007 | Kagawa | G09G 3/3406 345/84 |
| 2007/0139326 A1 | 6/2007 | Kwon et al. | |
| 2007/0168621 A1* | 7/2007 | Taneja | G06T 1/60 711/147 |
| 2008/0084524 A1* | 4/2008 | Inuzuka | G09G 3/3413 349/108 |
| 2009/0102769 A1* | 4/2009 | Kouno | G09G 3/3648 345/88 |
| 2009/0207182 A1* | 8/2009 | Takada | G09G 3/3406 345/589 |
| 2010/0007679 A1* | 1/2010 | Sakaigawa | G09G 3/3406 345/690 |
| 2010/0157112 A1* | 6/2010 | Miyagi | H04N 5/202 348/242 |
| 2011/0007182 A1* | 1/2011 | Yamada | H04N 1/4074 348/224.1 |
| 2011/0084990 A1* | 4/2011 | An | G09G 3/3648 345/690 |
| 2011/0149166 A1* | 6/2011 | Botzas | H04N 5/202 348/649 |
| 2011/0261255 A1* | 10/2011 | Nagata | G09G 5/005 348/441 |
| 2011/0292246 A1* | 12/2011 | Brunner | G06T 5/009 348/231.99 |
| 2012/0206390 A1* | 8/2012 | Ueno | G06F 3/016 345/173 |
| 2013/0139097 A1* | 5/2013 | Amano | G06F 3/033 715/781 |
| 2015/0194088 A1* | 7/2015 | Jung | G09G 3/3413 345/83 |
| 2016/0307493 A1* | 10/2016 | Song | G09G 3/2003 |

OTHER PUBLICATIONS

Chinese Office Action, Chinese Application No. 201510698050.6, dated Sep. 18, 2017, 18 pages.

* cited by examiner

DATA CONVERSION UNIT AND METHOD

CROSS REFERENCE TO RELATED APPLICATIONS

The present application claims priority under 35 U.S.C. § 119(a) of Korean Patent Application No. 10-2014-0144503 filed on Oct. 23, 2014, which is hereby incorporated by reference in its entirety.

BACKGROUND

Field of the Disclosure

The present application relates to a data conversion unit and method.

Description of the Related Art

Display devices can display various types of image data captured by a still photo or digital video camera, obtained from a still photo archive, generated through software application, or received through broadcast or streaming mediums. The display devices can be integrated with a variety of electrical appliances. For example, the display devices can be integrated with desktop computers, laptop computers, computer workstations, personal digital assistants, mobile device such as mobile phones, wireless communication devices, multimedia devices, exclusive viewing stations such as cameras and television receivers. Also, the display devices can be combined with the other electrical appliances. In other words, the display devices can be applied to a variety of electrical appliances. Such display devices can include liquid crystal display (LCD) devices, cathode ray tube (CRT) display devices, plasma display devices, projection display devices, organic light emitting diode display devices and so on.

Recently, the display devices are being developed to realize high image quality and reduce power consumption through increment of brightness. Meanwhile, the display device not only displays a color image using three primary colors including red, green and blue colors but also realizes peak brightness using the red, green and blue colors. In other words, the white color must depend on the red, green and blue colors. As such, it is difficult for desired brightness of the white color to control brightnesses of the red, green and blue colors. Particularly, it is more difficult for the LCD display device to increase brightness due to transmittance of liquid crystal.

Moreover, multi-frame HDR (high dynamic range) imaging technology is employed for realizing the high dynamic range. However, the multi-frame HDR imaging technology requires complex operations. As a result, the multi-frame HDR imaging technology must increase memory capacity and cost thereof.

BRIEF SUMMARY

Accordingly, embodiments of the present application are directed to data conversion unit and method that substantially obviate one or more of problems due to the limitations and disadvantages of the related art.

The embodiments relate to providing a data conversion unit and method adapted to increase brightness by adding white pixel data.

Also, the embodiments relate to providing a data conversion unit and method adapted to independently control brightness of white data signals.

Moreover, the embodiments relate to providing a data conversion unit and method adapted to realize a high contrast ratio without increasing brightness of backlight.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

A data conversion unit according to an aspect of the present embodiment can include: a transformation portion configured to transform R (red), G (green) and B (blue) sub-pixel data signals of input image data into R, G, B and W (white) sub-pixel data signals; and a brightness reinforcement portion configured to adjust brightness of a transformed W sub-pixel data signal included in the transformed R, G, B, and W sub-pixel data signals based on brightness distribution of the input image data.

The data conversion unit according to an aspect of the present embodiment can further include a RGB reinforcement portion configured to selectively perform saturation reinforcement for transformed R, G, and B sub-pixel data signals according to a color attribute pattern of the R, G, and B sub-pixel data signals.

In the data conversion unit according to an aspect of the present embodiment, the brightness reinforcement portion can include: a brightness distribution determiner configured to determine the brightness distribution of the input image data using the R, G, and B sub-pixel data signals of the input image data; a tone mapping curve generator configured to generate a tone mapping curve based on the determined brightness distribution; and a brightness adjuster configured to adjust the brightness of the transformed W sub-pixel data signal based on the generated tone mapping curve.

In the data conversion according to an aspect of the present embodiment, the brightness distribution determiner can divide color pixel data signals of the input image data into N color pixel data signal groups (e.g., two or more groups) based on a brightness of each color pixel data signal determined using the brightness distribution, where N is at least two, and identify from the N color pixel data signal groups a maximum pixel data signal group including a largest number of color pixel data signals.

The data conversion unit according to an aspect of the present embodiment can adjust the brightness of the of the transformed W sub-pixel data signal by adjusting the gray scale level range opposite to the maximum pixel data signal group based on the generated tone mapping curve.

The RGB reinforcement portion included in the data conversion unit according to an aspect of the present embodiment can include: a color attribute pattern analyzer configured to analyze the color attribute pattern of the R, G, and B sub-pixel data signals; a saturation gain generator configured to selectively generate saturation gain values based on the analyzed color attribute pattern; and a RGB adjuster configured to adjust the transformed R, G, and B sub-pixel data signals using the generated saturation gain values.

In the data conversion unit according to an aspect of the present embodiment, the saturation gain generator can include: a first saturation gain generator configured to generate variable saturation gain values for the transformed R, G, and B sub-pixel data signals responsive to the R, G, and B sub-pixel data signals corresponding to a chromatic color; and a second saturation gain configured to generate fixed saturation gain values for the transformed R, G, and B sub-pixel data signals responsive to the R, G, and B sub-pixel data signals corresponding to an achromatic color.

The data conversion unit according to an aspect of the present embodiment can allow the variable saturation gain values to be varied along gray scale values of the R, G, and B sub-pixel data signals of the input image data.

The data conversion unit according to an aspect of the present embodiment can further include a de-gamma portion configured to perform a de-gamma treatment for the R, G, and B sub-pixel data signals, the de-gamma treated R, G, and B sub-pixel data signals transformed into the transformed R, G, B, and W sub-pixel data signals.

The data conversion unit according to an aspect of the present embodiment can include a rending portion configured to combine the brightness-adjusted transformed W sub-pixel data signal and the saturation-reinforced transformed R, G, and B sub-pixel data signals.

A data conversion method according to another aspect of the present embodiment can include: transforming R (red), G (green) and B (blue) sub-pixel data signals of input image data into R, G, B and W (white) sub-pixel data signals; analyzing the brightness distribution of the input image data; and adjusting brightness of a transformed W sub-pixel data signal included in the transformed R, G, B, and W sub-pixel data signals based on the brightness distribution.

The data conversion method according to another aspect of the present embodiment can further include: generating a histogram describing brightness distribution of the input image data using the R, G, and B sub-pixel data signals; dividing color pixel data signals of the input image data into N color pixel data signal groups based on a brightness of each color pixel data signal determined from the histogram, where N is at least two; identifying from the N color pixel data signal groups a maximum color pixel data signal group including a largest number of color pixel data signals; identifying a tone mapping curve based on the identified maximum color pixel data signal group; and adjusting the brightness of the transformed W sub-pixel data signal based on the identified tone mapping curve.

The data conversion method according to an aspect of the present embodiment can further include: analyzing a color attribute pattern of the R, G, and B sub-pixel data signals; setting saturation gain values based on the analyzed color attribute pattern; and performing a saturation adjustment for the transformed R, G, and B sub-pixel data signals included in the transformed R, G, B, and W sub-pixel data signals using the set saturation gain values.

The data conversion method according to an aspect of the present embodiment can further include setting variable saturation gain values in response to determining based on the color attribute pattern that the R, G, and B sub-pixel data signals correspond to a chromatic color; and setting fixed saturation gain values in response to determining based on the color attribute pattern that the R, G, and B sub-pixel data signals correspond to an achromatic color.

In the data conversion method according to an aspect of the present embodiment, the variable saturation gain values are varied along gray scale values of the R, G, and B sub-pixel data signals of the input image data.

The data conversion method according to an aspect of the present embodiment can further include combining the brightness-adjusted transformed W sub-pixel data signal and the saturation-adjusted transformed R, G, and B sub-pixel data signals.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
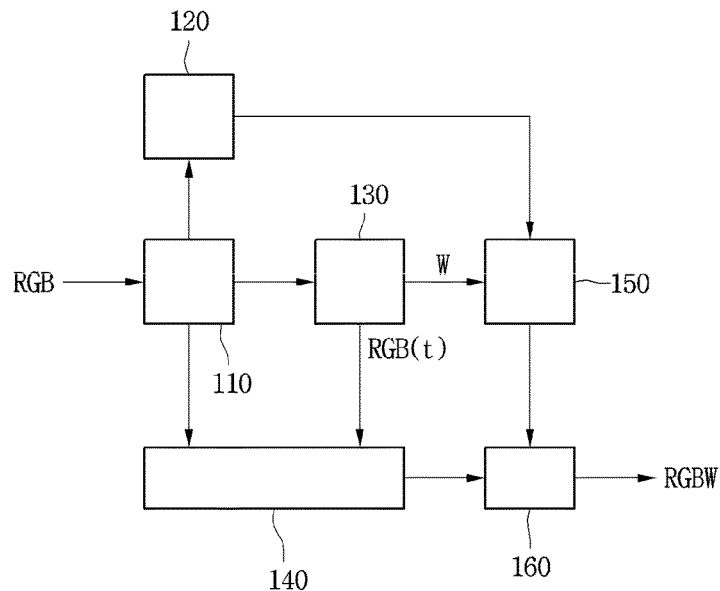
FIG. 1 is a block diagram showing a data conversion unit according to an embodiment of the present disclosure.

Reference will now be made in detail to an OLED display device in accordance with the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

For the convenience of explanation, some terms being used in the present disclosure can be defined as follows.

"Color pixel data signal" includes R (red), G (green) and B (blue) sub-pixel data signals. "Image data" includes color pixel data signals which are continuously arranged in a row or a line. In detail, "image data" includes R, G and B sub-pixel data signals which are arranged repeatedly and alternately with one another. Also, "RGB data signals" means that R, G and B sub-pixel data signals are arranged repeatedly and alternately with one another. Similarly, "RGBW data signals" represent the R, G, B and W sub-pixel data signals are arranged repeatedly and alternately with one another.

FIG. 1 is a block diagram showing a data conversion unit 100 according to an embodiment of the present disclosure. The data conversion unit 100 receives as an input red (hereinafter, "R"), green (hereinafter, "G") and blue (hereinafter, "B") data signals and converts the R, G and B data signals into R, G, B and white (hereinafter, "W") data signals. Also, the data conversion unit 100 can reinforce saturations of the R, G and B data signals and brightness of the W data signal and output the reinforced R, G, B and W data signals. To this end, the data conversion unit 100 can include a de-gamma portion 110, a histogram analyzer 120, a RGB to RGBW (hereinafter, "RGB-RGBW") transformation portion 130, a RGB reinforcement portion 140, a brightness reinforcement portion 150 and a rendering portion 160, as shown in FIG. 1. In one embodiment, the portions of the data conversion unit 100 are separate circuit blocks.

The de-gamma portion 110 receives as an input RGB data signals for images and performs a de-gamma treatment for the input RGB data signals in a frame unit. Also, the de-gamma portion 110 performs a bit-stretch treatment for the de-gamma-treated RGB data signals. More specifically, the de-gamma portion 110 compensates for gamma errors, which are generated in a display panel, through the de-gamma treatment. As such, the de-gamma-treated RGB signals can allows the display panel to have a linear optical property. Also, the de-gamma portion 110 can increase the de-gamma-treated RGB data signals in the number of bits through the bit stretch treatment. In accordance therewith, the generation of bit overflow phenomena at data operations, which are performed for converting the RGB data signals into the RGBW data signals, can be prevented. Such a de-gamma portion 110 can simultaneously perform the de-gamma treatment and the bit stretch treatment using a de-gamma LUT (look-up-table).

The histogram analyzer 120 receives the de-gamma-treated RGB data signals from the de-gamma portion 110. Also, the histogram analyzer 110 analyzes information involved in the de-gamma-treated RGB data signals. The analyzed information obtained from the RGB data signals is necessary to reinforce brightness of the W data signal. Such analyzed information can become a histogram which includes contrast differences between bright and dark patterns (or sites) within the respective image, a distribution of bright values within the respective image or others. In detail, the histogram can be defined as an aggregate which includes the number of pixels for each bright value within a single image. Actually, the histogram can provide pixel distributions for gray scale levels of 0~255 within a single image. Such a histogram analyzer 120 can analyze distributions of pixels within a single image in accordance with brightness on the basis of the input RGB data signals. Moreover, the histogram analyzer 120 can provide histograms (i.e., RGB histograms) for each of RGB components because of receiving the RGB data signals.

The RGB-RGBW transformation portion 130 converts the RGB data signals, which are applied from the de-gamma portion 110, into transformed RGBW data signals. The RGBW data signals obtained by the RGB-RGBW transformation portion 130 are used to drive a display panel including RGBW sub-pixels. In order to optimize power consumption without changing color coordinates, the RGB-RGBW transformation portion 130 can add a W data signal using RGB data components, which are based on measured or estimated values having the same brightness and color coordinate as a W data component, and perform subtractions of the RGB data components from the (de-gamma)-treated RGB data signals. For example, the RGB-RGBW transformation portion 130 can generate the W data signal by extracting one of a common gray scale value, which is represented by equation 1, and a minimum gray scale value, which is represented by equation 2, from the (de-gamma)-treated RGB data signal. Also, the RGB-RGBW transformation portion 130 can generate secondary RGB data signals by subtracting the W data signal from each of the (de-gamma)-treated RGB data signals.

$$W=\mathrm{Com}(R,G,B) \quad \text{[Equation 1]}$$

$$W=\mathrm{Min}(R,G,B) \quad \text{[Equation 2]}$$

In another embodiment, the RGB-RGBW transformation portion 130 can convert R, G and B data signals into four color data signals, which include R, G, B and W data signals, using data conversion methods which are based on properties of each sub-pixel such as a brightness property of the sub-pixel and a driving property of the sub-pixel. In this case, the RGB-RGBW transformation portion 130 can convert the RGB data signals into the RGBW data signals using data conversion methods which are disclosed in Korean patent publication nos. 10-2013-0060476 and 10-2013-0030598.

For the convenience of explanation, the (de-gamma)-treated RGB data signals being input to the RGB-RGBW transformation portion 130 will be referred to as "primary RGB data signals" and the RGB data signals of the RGBW data signals being output from the RGB-RGBW transformation portion 130 will be referred to as "transformed RGB data signals".

The RGB reinforcement portion 140 receives as an input the primary RGB data signals from the de-gamma portion 110 and analyzes saturation components for the primary RGB signals. Also, the RGB reinforcement portion 140 receives as an input the transformed RGB data signals RGB(t) of the RGBW data signals, which are generated in the RGB-RGBW transformation portion 130, and reinforce the saturation of the transformed RGB data signals RGB(t) among the RGBW data signals on the basis of the analyzed saturation components. The saturation means a hue quantity in an arbitrary color or a color purity which is varied along the progression from a white color to a gray color. As such, the saturation of a color can become higher as the color is closer to a light spectrum which is mixed with any one of white and black colors. The RGB reinforcement portion 140 can distinguish on the basis of the primary RGB data signals whether an image is close to an achromatic color or a chromatic color. If the image is close to the achromatic color, the RGB reinforcement portion 140 can reinforce the saturations of the transformed RGB data signals RGB(t). The achromatic color means a color which includes only intensity without any hue and saturation, and the chromatic color means every color with the exception of the achromatic colors. In order to reinforce the saturations of the transformed RGB data signals, the RGB reinforcement portion 140 can transform the primary RGB data signals into a HIS (hue-intensity-saturation) color model. Also, the RGB reinforcement portion 140 can differently reinforce the saturations of the transformed RGB data signals RGB(t) on the basis of the HIS color model. Such a HIS color model is based on (or derived from) the human color perception model. As such, the HIS color model allows hue, saturation and intensity to be distinguished.

The brightness reinforcement portion 150 receives as an input the W data signal among the RGBW data signals which are generated by the RGB-RGBW transformation portion 130. Also, the brightness reinforcement portion 150 reinforces the brightness of the W data signal on the basis of the analyzed histogram which is applied from the histogram analyzer 120.

The rendering portion 160 combines the reinforced RGB data signals, which are applied from the RGB reinforcement portion 140, with the reinforced W data signal which is applied from the brightness reinforcement portion 150. As such, reinforced RGBW data signals can be output from the rendering portion 160. Also, the rendering portion 160 can correct contour, color, shadow, position and so on, in order to enhance reality of an image.

Figure 2:
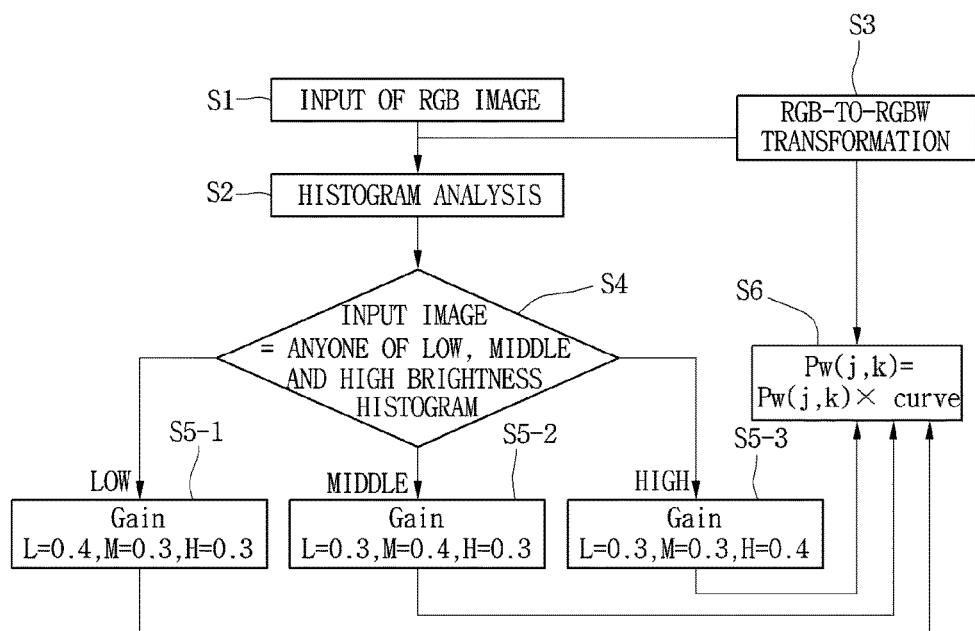
FIG. 2 is a flow chart illustrating an operation procedure of a brightness reinforcement portion in FIG. 1.
Figure 3A:
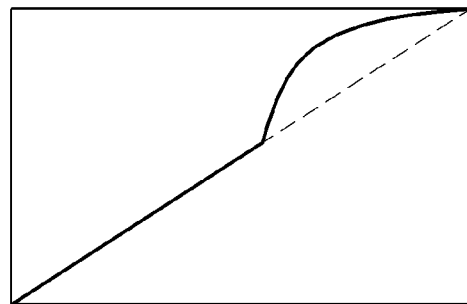
FIGS. 3A through 3C are graphs illustrating examples of tone mapping curves.
Figure 3B:
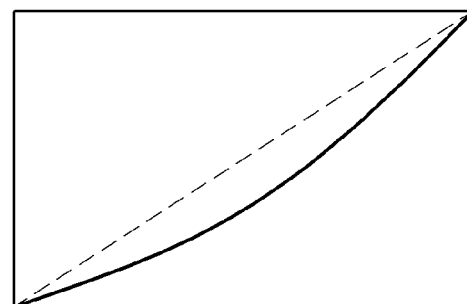
Figure 3C:
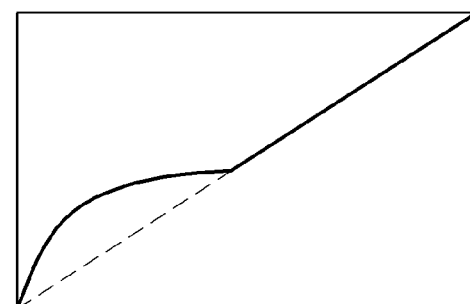

FIG. 2 is a flow chart illustrating operation procedure of the brightness reinforcement portion 150 of FIG. 1. FIGS. 3A through 3C are graphs illustrating examples of tone mapping curves.

Referring to FIG. 2, image data including the primary RGB data signal is input to the histogram analyzer 120 and the RGB-RGBW transformation portion 130 (step S1). In step S2, the histogram analyzer 120 analyzes the distribution of pixel data signals of the image data in accordance with brightness. Meanwhile, the RGB-RGBW transformation portion 130 transforms the primary RGB data signals into the RGBW data signals (Step S3). The brightness reinforcement portion 150 can reinforce (or emphasize) the brightness of the W data signal by performing steps S4 through S6. More specifically, the brightness reinforcement portion 150 can determine based on the analyzed information, which includes the distribution of the pixel data signals, whether the image data corresponds to any one of low, middle and high brightness histograms (Step S4). Subsequently, the brightness reinforcement portion 150 can select any one of tone mapping curves on the basis of the determined histogram (Step S5). Finally, the brightness reinforcement portion 150 can adjust the brightness of the W data signal, which is applied from the RGB-RGBW transformation portion 130, according to the selected tone mapping curve (Step S6).

The low brightness histogram means that the number of pixel data signals having dark (or low) brightness has the highest value in the input image data. In other words, the low brightness histogram represents that the number of pixel data signals having brightness close to the lowest gray scale level (for example, "0") becomes the highest value in the image data. The high brightness histogram means that the number of pixel data signals having bright (or high) brightness has the highest value in the input image data. In other words, the high brightness histogram represents that the number of pixel data signals having brightness close to the highest gray scale level (for example, "255") becomes the highest value in the image data. The middle brightness histogram means that the number of pixel data signals having middle brightness is the highest value in the input image data. In other words, the middle brightness histogram represents that the number of pixel data signals having brightness of the middle gray scale level range is the highest value in the input image data.

The step S5 can include sub-steps S5-1 through S5-3. In detail, if it is determined in the step S4 that the input image data corresponds to the low brightness histogram, a tone mapping curve as shown in FIG. 3A can be selected (Sub-step S5-1). In this case, the low brightness of the input image data can be reinforced through the step S6. As such, the contrast range (or contrast ratio) of the input image data can be enhanced. Also, another tone mapping curve as shown in FIG. 3B can be selected (Sub-step S5-2) when it is determined in the step S4 that the input image data has the middle brightness histogram. As such, the middle brightness of the input image data can be reinforced through the step S6. In accordance therewith, the contrast range of the input image data can be enhanced. Moreover, still another tone mapping curve as shown in FIG. 3C can be selected (Sub-step S5-3) when it is determined in the step S4 that the input image data has the high brightness histogram. As such, the high brightness of the input image data can be reinforced through the step S6. In accordance therewith, the contrast range of the input image data can be enhanced. The tone mapping curves shown in FIGS. 3A through 3C are used for adjusting the brightness range (or ratio), but the present disclosure is not limited to this. In other words, a variety of tone mapping curves can be used according to degree or width of adjustment of contrast range (or ratio).

In the Step S6, the brightness reinforcement portion 150 adjusts the brightness of the W data signal, which is output from the RGB-RGBW transformation portion 130, according to the selected tone mapping curve. As such, the contrast range (or ratio) of the input image data can be adjusted (or enhanced).

Figure 4:
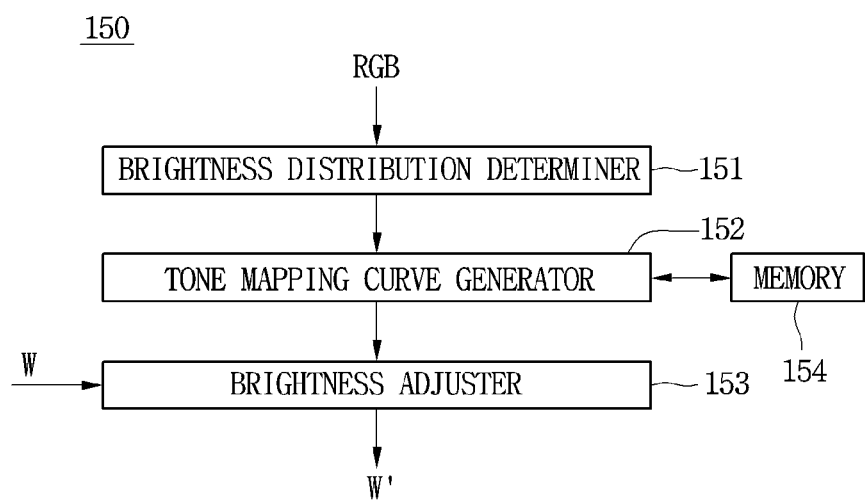
FIG. 4 is a detailed block diagram showing a brightness reinforcement portion of FIG. 1.

FIG. 4 is a detailed block diagram showing an example of the brightness reinforcement portion 150 in FIG. 1.

Referring to FIG. 4, the brightness reinforcement portion 150 can include a brightness distribution determiner 151, a tone mapping curve generator 152 and a brightness adjuster 153.

The brightness distribution determiner 151 determines a degree of brightness, at which the largest number of color pixel data signals are positioned, on the basis of the analyzed information applied from the histogram analyzer 120. For example, the brightness can be defined into n degrees. The "n" is an integer of at least 2. As such, the distribution of color pixel data signals can be distinguished into n pixel data groups. If the "n" is 3, the color pixel data signals can be grouped into first through third pixel data groups. In this case, the first pixel data group includes the color pixel data signals positioned in a first brightness level (or value) range, the second pixel data group includes the color pixel data signals positioned in a second brightness level range, and the third pixel data group includes the color pixel data signals positioned in a third brightness level range. The first through third brightness level ranges can be established by dividing a full brightness level range of 0 through 255 without overlapping with one another. In other words, the color pixel data signals included in the input image data can be divided (or grouped) into the first pixel data group having the first brightness level range of 0~a first gray scale level, the second pixel data group having the second brightness level range, which is more than the first brightness level but less than a second brightness level, and the third pixel data group having the third brightness level range of the second brightness level~255. As such, the brightness distribution determiner 151 can determine whether a maximum pixel data group including a greatest number of color pixel data signals corresponds to anyone of the first through third pixel data groups. The first gray scale level is more than "0" but less than the second gray scale level, and the second gray scale level is less than "255".

The tone mapping curve generator 152 generates a tone mapping curve in accordance with the determined resultant of the brightness distribution determiner 151. The tone mapping curve generated in the tone mapping curve generator 152 can be used to adjust the brightness of the color pixel data signals (i.e., W sub-pixel data signals) which have the brightness levels corresponding to the maximum pixel data group. In another embodiment, the brightness reinforcement portion 150 includes a memory 154. The memory 154 stores a variety of tone mapping curves which includes three mapping curves shown in FIGS. 3A through 3C. In this embodiment, the tone mapping curve generator 152 reads the memory 154 and select anyone of the stored tone mapping curves. In other words, the tone mapping curve generator 152 can read-out a tone mapping curve, which corresponds to the determined resultant of the brightness distribution determiner 151, from the memory 154.

The brightness adjuster 153 adjusts the brightness of the W data signal (i.e., the W sub-pixel data signals) on the basis of the tone mapping curve which is generated in (or selected by) the tone mapping curve generator 152. Also, the brightness adjuster 153 outputs the adjusted W data signal (or adjusted W sub-pixel data signals). In this manner, the generated or selected tone mapping curve can change along degrees of the brightness of the input image data, i.e. the distribution of color pixel data signals in accordance with low, middle and high brightness level ranges. As such, an image with a high contrast range (or ratio) can be realized by the adjusted W data signal (or the adjusted W sub-pixel data signals).

Also, the data conversion unit 100 according to the present disclosure can be applied to an LCD device. In this case, the LCD device can adjust the contrast range of the W data signal corresponding to a brightness component. As such, the LCD device can display an image of a high contrast ratio without increasing the luminosity of a backlight. In accordance with, the LCD device can reduce power consumption.

Figure 5:
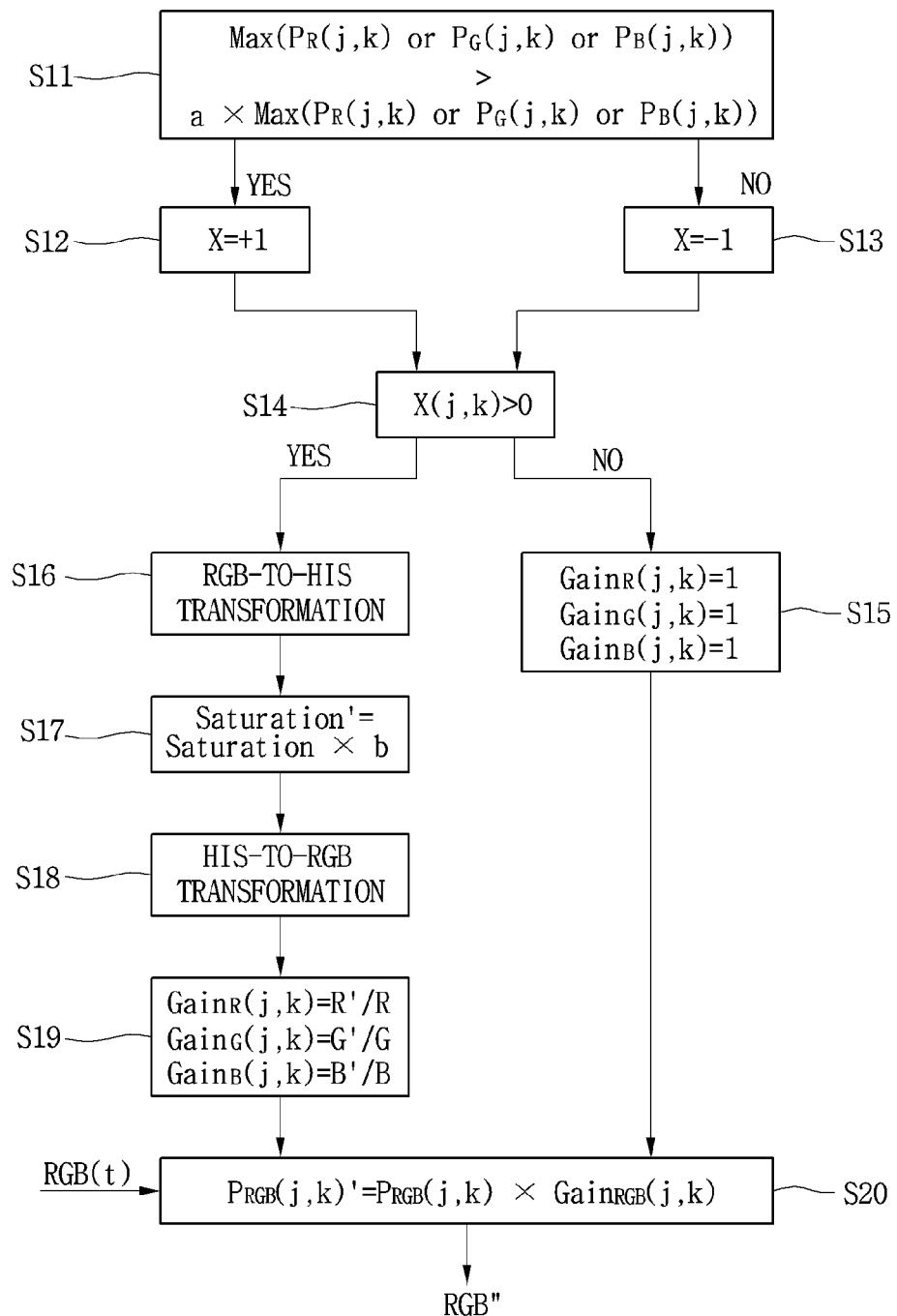
FIG. 5 is a flowchart illustrating an operation procedure of the RGB reinforcement portion in FIG. 1.

FIG. 5 is a flowchart illustrating an operation procedure of the RGB reinforcement portion 140 shown in FIG. 1.

The RGB reinforcement portion 140 analyzes a color attribute pattern for each color pixel data signal of the input image data using the primary RGB data signals. The analyzed resultant of the color attribute pattern for one color pixel data signal (hereinafter, "respective color pixel data signal") can be obtained by sequentially performing a color attribute analysis for the respective (corresponding) color pixel data signal and 8 color pixel data signals two-dimensionally adjacent thereto. If the respective color pixel data signal Pjk is opposite to a jk color pixel Pjk which is positioned at an intersection of a jth vertical line and a kth horizontal line, the 8 color pixel data signals $P_{(j-1)(k-1)}$, $P_{j(k-1)}$, $P_{(j+1)(k-1)}$, $P_{(j-1)k}$, $P_{(j+1)k}$, $P_{(j-1)(k+1)}$, $P_{j(k+1)}$ and $P_{(j+1)(k+1)}$ adjacent to the respective color pixel data signal Pjk can be opposite to (j−1)(k−1), j(k−1), (j+1)(k−1), (j−1)k, (j+1)k, (j−1)(k+1), j(k+1) and (j+1)(k+1) color pixels. In order to analyze the color attribute for a color pixel data signal Pjk, as shown in FIG. 5, the RGB reinforcement portion 140 checks gray scale values of primary RGB sub-pixel data signals for the color pixel data signal and selects the largest sub-pixel data signal and the smallest sub-pixel data signal (Step S11). Also, the RGB reinforcement portion 140 multiplies the smallest sub-pixel data signal by a color attribution coefficient "a" and determines whether the multiplied value is larger or smaller than the largest sub-pixel data signal. If the multiplied value is smaller than the largest sub-pixel data signal, the RGB reinforcement portion 140 counts up a pixel number Xjk by "1" (Step S12). On the contrary, when the multiplied value is larger than the largest sub-pixel data signal, the RGB reinforcement portion 140 counts down (or decreases) the pixel number Xjk by "1" (Step S13). When such a color attribute analysis for the respective color pixel data signal Pjk and the 8 adjacent color pixel data signals thereto is completed, the RGB reinforcement portion 140 determines on the basis of the counted pixel number Xjk whether the respective color pixel data signal Pjk corresponds to anyone of chromatic or achromatic colors (Step S14). If the counted pixel number Xjk is larger than "0", the RGB reinforcement portion 140 determines that the respective color pixel data signal Pjk corresponds to the chromatic color. On the contrary, when the counted pixel number Xjk is smaller than "0", the RGB reinforcement portion 140 determines that the respective color pixel data signal Pjk corresponds to the achromatic color. Meanwhile, the color attribution coefficient "a" is a previously set value. For example, the color attribution coefficient "a" can be set to "1.5" but it is not limited to this. In other words, the color attribution coefficient "a" can be varied along conditions discriminating between the chromatic and achromatic colors.

If it is determined in the step S14 that the respective color pixel data signal corresponds to the achromatic color, the RGB reinforcement portion 140 sets all the RGB gain values of the respective color pixel data signal to '1' (Step S15).

When it is determined in the step S14 that the respective color pixel data signal corresponds to the chromatic color, the RGB reinforcement portion 140 calculates variable RGB gain values in accordance with the gray scale values of the primary RGB sub-pixel data signals by performing steps S16 through S19. In detail, the RGB reinforcement portion 140 transforms the primary RGB sub-pixel data signals of the respective color pixel data signal into hue, intensity and saturation values (Step S16). Afterward, in order to emphasize the transformed saturation value, the RGB reinforcement portion 140 multiplies the transformed saturation component by a saturation emphasis coefficient "b" (Step S17). Subsequently, the RGB reinforcement portion 140 inverse-transforms the hue value, the intensity value and the multiplied saturation value into R, G and B sub-pixel data signals RGB' (Step S18). Thereafter, the RGB reinforcement portion 140 sets the variable RGB gain values of the transformed RGB sub-pixel data signals RGB(t) by dividing each of the inverse-transformed R, G and B sub-pixel data signals by each of the primary R, G and B sub-pixel data signals (Step S19). As such, the R gain value can be set to a ratio of "the inverse-transformed R sub-pixel data signal R'/the primary R sub-pixel data signal R". The G gain value can be set to a ratio of "the inverse-transformed G sub-pixel data signal G'/the primary G sub-pixel data signal G". The B gain value can be set to a ratio of "the inverse-transformed B sub-pixel data signal B'/the primary B sub-pixel data signal B". Meanwhile, the saturation emphasis coefficient "b" is a previously set value. For example, the saturation emphasis coefficient "b" can be set to "1.1" but it is not limited to this. In other words, the saturation emphasis coefficient "b" can be varied along a degree of reinforcement of the saturation component.

Also, the RGB reinforcement portion 140 can reinforce the transformed R, G and B sub-pixel data signals RGB(t) using the gain values which are set in the step S15 or S19 (Step S20). The reinforced R, G and B sub-pixel data signals RGB" are applied to the rendering portion 160.

In this manner, the RGB reinforcement portion 140 divides the color pixel data signals of the input image data into the chromatic and achromatic colors and performs the saturation reinforcement only for the color pixel data signals corresponding to the chromatic color. As such, the saturation of the image can be efficiently enhanced.

Figure 6:
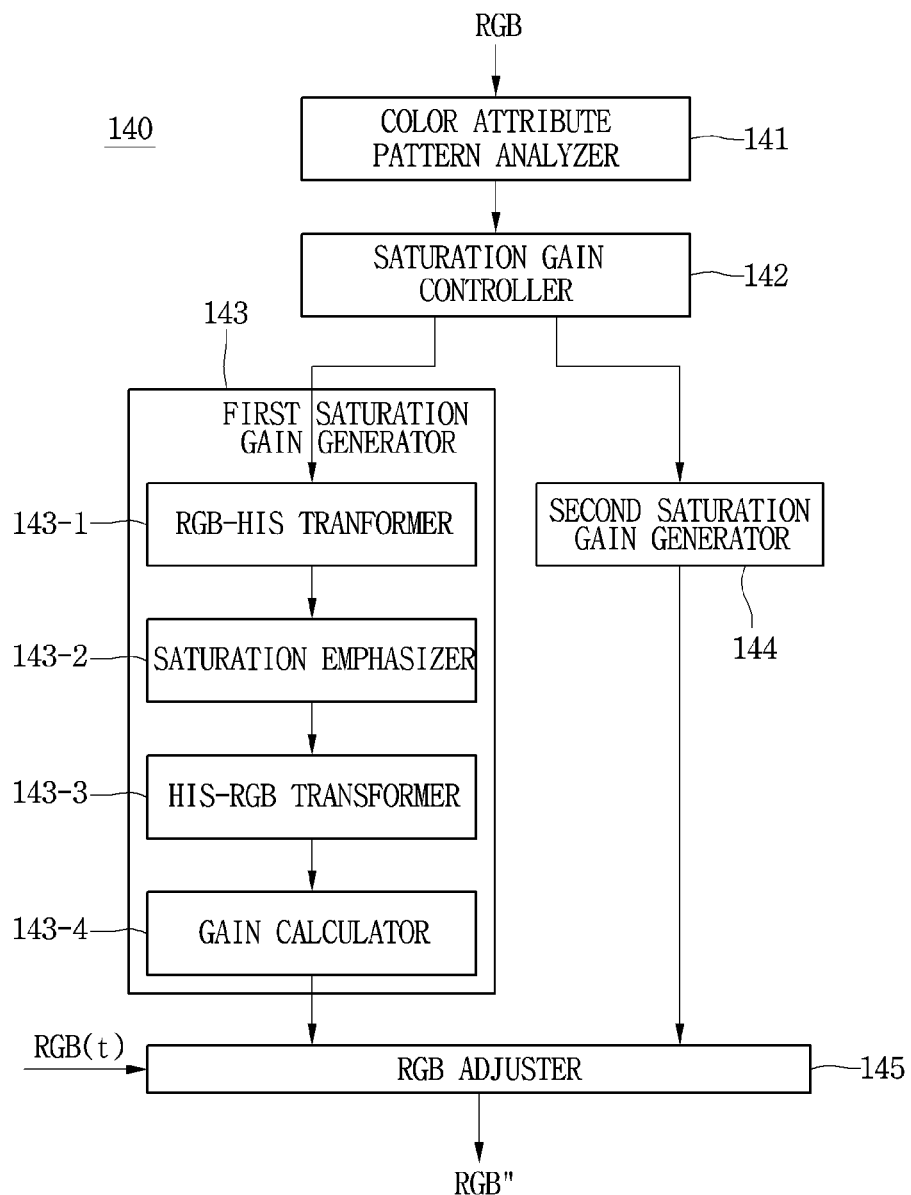
FIG. 6 is a detailed block diagram showing an example of the RGB reinforcement portion in FIG. 1

FIG. 6 is a detailed block diagram showing an example of the RGB reinforcement portion 140 in FIG. 1.

Referring to FIG. 6, the RGB reinforcement portion 140 can include a color attribute pattern analyzer 141, a saturation gain controller 142, a first saturation gain generator 143, a second saturation gain generator 144 and a RGB adjuster 145. The first saturation gain generator 143 can include a RGB-to-HIS (hereinafter, 'RGB-HIS') transformer 143-1, a saturation emphasizer 143-2, a HIS-to-RGB (hereinafter, 'HIS-RGB') transformer 143-3 and a gain calculator 143-4.

The color attribute pattern analyzer 141 analyzes a color attribute pattern for each color pixel data signal of the input image data using the primary RGB data signals. Also, the color attribute pattern analyzer 141 applies an analyzed resultant of the color attribute pattern for each color pixel data signal to the saturation gain controller 142. The analyzed resultant of the color attribute pattern for one color pixel data signal (hereinafter, "respective color pixel data signal") can be obtained by sequentially performing a color attribute analysis for the respective (corresponding) color pixel data signal and 8 color pixel data signals two-dimensionally adjacent thereto. If the respective color pixel data signal Pjk is opposite to a (jk)th color pixel Pjk which is positioned at an intersection of a jth vertical line and a kth horizontal line, the 8 color pixel data signals $P_{(j-1)(k-1)}$, $P_{j(k-1)}$, $P_{(j+1)(k-1)}$, $P_{(j-1)k}$, $P_{(j+1)k}$, $P_{(j-1)(k+1)}$, $P_{j(k+1)}$ and $P_{(j+1)(k+1)}$ adjacent to the respective color pixel data signal Pjk can be opposite to ((j−1)(k−1))th, (j(k−1))th, ((j+1)(k−1))th, ((j−1)k)th, ((j+1)k)th, ((j−1)(k+1))th, (j(k+1))th and ((j+1)(k+1))th color pixels. In order to analyze the color attribute for an color pixel data signal, the color attribute pattern analyzer 141 checks gray scale values of primary RGB sub-pixel data signals for the color pixel data signal and selects the largest sub-pixel data signal and the smallest sub-pixel data signal. Also, the color attribute pattern analyzer 141 multiplies the smallest sub-pixel data signal by a color attribution coefficient "a" and determines whether the multiplied value is larger or smaller than the largest sub-pixel data signal. If the multiplied value is smaller than the largest sub-pixel data signal, the color attribute pattern analyzer 141 counts up a pixel number Xjk by "1". On the contrary, when the multiplied value is larger than the largest sub-pixel data signal, the color attribute pattern analyzer 141 counts down (or decreases) the pixel number Xjk by "1". When such a color attribute analysis for the respective color pixel data signal Pjk and the 8 adjacent color pixel data signals thereto is completed, the color attribute pattern analyzer 141 supplies the saturation gain controller 142 with the counted pixel number Xjk which is used as an analyzed resultant of the color attribute pattern for one color pixel data signal.

The saturation gain controller 142 determines on the basis of the counted pixel number Xjk, which is applied from the color attribute pattern analyzer 141, whether the respective color pixel data signal Pjk corresponds to anyone of chromatic or achromatic colors. If the counted pixel number Xjk is larger than "0" (i.e., a positive number), the saturation gain controller 142 determines that the respective color pixel data signal Pjk corresponds to the chromatic color. On the contrary, when the counted pixel number Xjk is smaller than "0" (i.e., a negative number), the saturation gain controller 142 determines that the respective color pixel data signal Pjk corresponds to the achromatic color.

If the respective color pixel data signal Pjk corresponds to the chromatic color, the saturation gain controller 142 can drive the first saturation gain generator 143. On the contrary, when the respective color pixel data signal Pjk corresponds to the achromatic color, the saturation gain controller 142 can drive the second saturation gain generator 144.

The first saturation gain generator 143 can be selectively driven by the saturation gain controller 142. Such a first saturation gain generator 143 can generate variable gain values of the transformed RGB data signals according to the primary RGB data signals. In detail, the RGB-HIS transformer 143-1 transforms the primary RGB sub-pixel data signals Rjk, Gjk and Bjk of the respective color pixel data signal Pjk into hue, intensity and saturation values. The saturation emphasizer 143-2 can emphasize the transformed saturation value, which is applied from the RGB-HIS transformer 143-1, by multiplying the transformed saturation value by a previously set saturation emphasis coefficient V. The HIS-RGB transformer 143-3 inverse-transforms the hue and intensity values from the RGB-HIS transformer 143-1 and the emphasized saturation value (or the multiplied value) from the saturation emphasizer 143-3 into RGB sub-pixel data signals Rjk', Gjk' and Bjk'. The gain calculator 143-4 divides each of the inverse-transformed RGB sub-pixel data signals Rjk', Gjk' and Bjk', which are applied from the HIS-RGB transformer 143-3, by each of the primary RGB sub-pixel data signals Rjk, Gjk and Bjk. As such, the gain calculator 143-4 can obtains an R gain value $Gain_{Rjk}$ of "Rjk'/Rjk", a G gain value $Gain_{Gjk}$ of "Gjk'/Gjk" and a B gain value $Gain_{Bjk}$ of "Bjk'/Bjk" with respect to the respective color pixel data signal Pjk.

The second saturation gain generator 144 can be selectively driven by the saturation gain controller 142. The second saturation gain generator 144 can generate fixed R, G and B gain values $Gain_R$, $Gain_G$ and $Gain_B$ which are previously set to a constant value regardless of the color pixel data signals. All the fixed R, G and B gain values can be set to "1", but the present disclosure is not limited to this.

The RGB adjuster 145 can reinforce the transformed RGB data signals RGB(t) of the input image data using either the variable RGB gain values, which are applied from the gain calculator 143-4 of the first saturation gain generator 143, or the fixed RGB gain values which are applied from the second saturation gain generator 144. In detail, when the first saturation gain generator 143 is driven, the RGB adjuster 145 adjusts (or reinforces) the transformed RGB sub-pixel data signals RGB(t) for each color pixel data signal using the variable RGB gain values which are varied along the color pixel data signals and applied from the gain calculator 143-4. Also, the RGB adjuster 145 adjusts (or reinforces) the transformed RGB sub-pixel data signals RGB(t) for each color pixel data signal using the fixed RGB gain values which are applied from the second saturation gain generator 144, when the second saturation gain generator 144 is driven instead of the first saturation gain generator 143. In other words, the RGB adjuster 145 either increases the gray scale values of the transformed RGB sub-pixel data signals RGB(t) or outputs the transformed RGB sub-pixel data signals RGB(t) as they are, on the basis of the analyzed color attribute pattern. As such, only the transformed RGB data signals corresponding to the chromatic color can be reinforced with the exception of the transformed RGB data signals RGB(t) corresponding to the achromatic color. Consequently, the RGB reinforcement portion 140 can perform the saturation reinforcement only for the chromatic color pixel data signal with the exception of the achromatic color pixel data signals. The reinforced RGB data signals RGB" are applied from the RGB adjuster 145 of the RGB reinforcement portion 140 to the rendering portion 160 shown in FIG. 1.

As described above, the data conversion unit 100 and method according to embodiments of the present disclosure can adjust the contrast ratio of the input image data by independently controlling the W data signal. As such, complex operations can be simplified and memory capacity can be reduced.

Also, the data conversion unit 100 and method according to embodiments of the present disclosure can analyze the brightness distribution of the color pixel data signals of the input image data, select or generate the tone mapping curve in accordance with the analyzed brightness distribution, and applies the selected or generated tone mapping curve to the W data signal. Therefore, a high contrast ratio can be realized.

Moreover, the data conversion unit 100 and method can analyze the color attribute pattern of each color pixel data signal of the input image data, set different emphasis ratios to the color pixel data signals of the input image data, and reinforce the color pixel data signals using the different emphasis ratios. In accordance with, the deterioration of the saturation of the input image data can be prevented, and furthermore image quality can be enhanced.

Furthermore, the data conversion unit 100 according to an embodiment of the present disclosure can be applied an LCD device can adjust the brightness of the W data signal without increasing the luminosity of the backlight. As such, difficulty in increasing brightness due to transmittance of a liquid crystal material can be solved. Also, the LCD device with the data conversion unit 100 can display a high brightness image.

Figure 7:
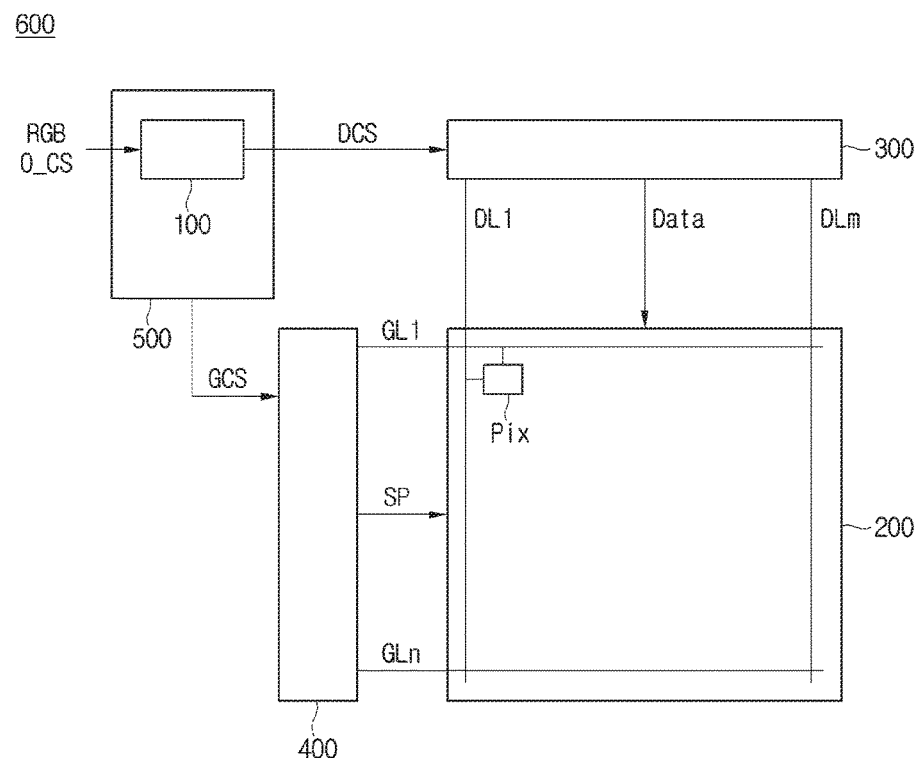
FIG. 7 is a block diagram showing a display device which includes a data conversion unit in accordance with an embodiment of the present disclosure.
Figure 8:
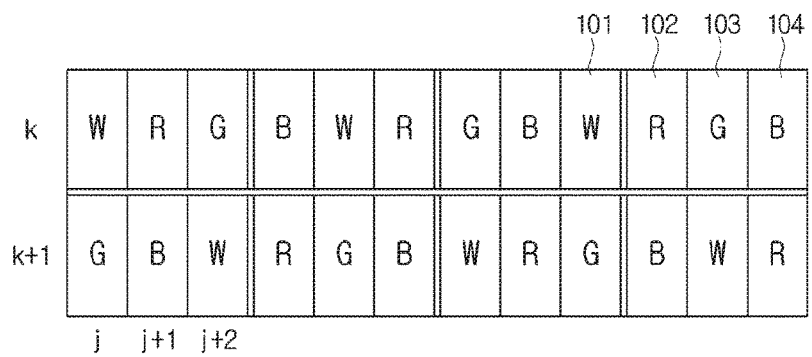
FIG. 8 is a planar view showing arrangement of sub-pixels.

FIG. 7 is a block diagram showing a display device 600 with a data conversion unit 100 according to an embodiment of the present disclosure. FIG. 8 is a planar view showing arrangement of sub-pixels.

Referring to FIG. 7, the display device 600 according to an embodiment of the present disclosure can include a display panel 200, a data driver 300, a gate driver 400 and a timing controller 500. The timing controller 500 can include the data conversion unit 100. Alternatively, the data conversion unit 100 can be included in the display device 600 in such a manner as to be separate from the timing controller 500.

In other words, the data conversion unit 100 can be built into the timing controller 500, or separated from the timing controller 500. Although it is explained that the data conversion unit 100 is applied to the display device 600, it is not limited to this. Alternatively, the data conversion unit 100 can be applied to wireless communication devices such as mobile wireless handsets, display modules of digital and video cameras, digital multimedia players, personal digital assistants (PDAs), video game consoles, video display devices and exclusive viewing stations such as television receivers.

The display panel 200 includes a plurality of gate lines GL1~GLn and a plurality of data lines DL1~DLm. Also, the display panel 200 includes sub-pixels Pix formed in respective regions which is defined by the pluralities of gate lines GL1~GLn and data lines DL1~DLm.

The gate driver 400 replies to gate control signals GCS applied from the timing controller 500, and supplies a plurality of scan signals SP to the plurality of gate lines GL1~GLn, respectively. The plurality of scan signals SP can sequentially enable the plurality of gate lines GL1~GLn in one horizontal synchronous signal interval. Such a gate driver 400 can be configured with a plurality of gate IC (Integrated circuit) chips.

The data driver 300 can reply to data control signals DCS applied from the timing controller 500 and generate data voltages whenever anyone among the plurality of gate lines GL1~GLn is enabled. The data voltages generated in the data driver 300 are applied to the plurality of data lines DL1~DLm on the display panel 200.

The timing controller 500 can generate the gate control signals GCS and the data control signals DCS using a various control signals which are applied from an external system (not shown) such as a graphic module of a computer system or an image demodulation module of a television receiver. The gate control signals GCS are used to control the gate driver 400 and the data control signals DCS are used to control the data driver 300.

The sub-pixels Pix on the display panel 200 can be used to display R, G, B and W colors. The color sub-pixels can be arranged as shown in FIG. 8. In detail, the color sub-pixels can be repeatedly arranged on an odd-numbered horizontal line k in order of a W sub-pixel 101, an R sub-pixel 102, a G sub-pixel 103 and a B sub-pixel 104. Also, the color sub-pixels can be repeatedly arranged on an even-numbered horizontal line k+1 in order of a G sub-pixel 103, a B sub-pixel 104, a W sub-pixel 101 and an R sub-pixel 102. As such, the color sub-pixels on the odd-numbered horizontal line k and the respective (or same) color sub-pixels on the even-numbered horizontal line k+1 can be arranged along a vertical direction in a zigzag pattern not a line (or row). For example, two W sub-pixels 101 can be positioned at an intersection of a jth vertical line and the odd-numbered horizontal line k and another intersection of a (j+1)th vertical line and the even-numbered horizontal line k+1. In other words, one of two same color sub-pixels (i.e., two R, G, B or W sub-pixels), which are adjacently positioned in an odd-numbered horizontal line k and an even-numbered horizontal line k+1 adjacent thereto, is disposed on an arbitrary vertical line (for example, jth vertical line), and the other one is disposed on a different vertical line (for example, (j−2 or J+2)th vertical line) which is shifted from the arbitrary vertical line by two sub-pixels in a lateral direction. Such zigzagged sub-pixel arrangement, which allows same color sub-pixels on the odd-numbered line k and the even-numbered horizontal line k+1 to be shifted from each other by the distance (or length) of two sub-pixels, can prevent the appearance of straight lines unless linear sub-pixel arrangement allowing same color sub-pixels to be arranged in a vertical direction.

For example, a liquid crystal display (LCD) device can be used as the display panel 200. In this case, the sub-pixel Pix includes a thin film transistor TFT connected to one of the gate lines GL1~GLn and one of the data lines DL1~DLm and a pixel electrode connected to the thin film transistor. The thin film transistor TFT transfers a data voltage on one of the data lines DL1~DLm to a liquid crystal cell (or the pixel electrode) in response to a scan signal SP from one of the gate lines GL1~GLn. To this end, the thin film transistor TFT includes a gate electrode connected to one of the gate lines GL1~GLn, a source electrode connected to one of the data lines DL1~DLm, and a drain electrode connected to the pixel electrode of the liquid crystal cell. Also, a storage capacitor for maintaining the voltage of the liquid crystal cell is formed on a lower glass substrate of the display panel 200. Moreover, color filters and a black matrix can be formed on an upper glass substrate of the display panel 200. The color filter is formed opposite to a pixel region in which the thin film transistor TFT is formed. The black matrix rims the color filters and shields the gate lines GL1~GLN, the data lines DL1~DLm, the thin film transistor and so one. Such color filters allow the sub-pixels to be distinguished in R, G, B and W sub-pixels. As such, the liquid crystal cells included in the R, G, B and W sub-pixels can be used to display R, G, B and W colors, respectively.

As another example of the display panel 200, an organic light emitting diode display panel can be used. In this case, the R, G, B and W sub-pixels can each include an organic light emitting diode. Such R, G, B and W sub-pixels can output respective color lights by emitting the respective organic light emitting diodes. As such, the organic light emitting diode display panel can display an image. The organic light emitting diode can be formed in either a structure including a hole transport layer, an organic emission layer and an electron transport layer or another structure including a hole injection layer, a hole transport layer, an organic emission layer, an electron transport layer and an electron injection layer. Moreover, a functional layer for enhancing light emission efficiency and life span of the organic emission layer can be additionally included in the organic light emitting diode.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the description of the present disclosure.

What is claimed is:

1. A display device, comprising:
   a data conversion unit comprising:
   a transformation circuit configured to transform input red sub-pixel, green sub-pixel, and blue sub-pixel data signals of input image data for an image into transformed red sub-pixel data signal, green sub-pixel data signal, blue sub-pixel data signal, and white sub-pixel data signal;
   a histogram analyzer circuit configured to generate a histogram describing brightness distribution of the input image data of the image using the red sub-pixel data signal, green sub-pixel data signal, and blue sub-pixel data signal; and
   a brightness reinforcement circuit configured to analyze the histogram and to adjust brightness of a transformed white sub-pixel data signal based on the analyzed histogram, wherein the transformed white sub-pixel data signal is included in the transformed red sub-pixel data signal, green sub-pixel data signal, blue sub-pixel data signal, and white sub-pixel data signal, the brightness reinforcement circuit including:
   a brightness distribution determiner circuit configured to analyze the histogram to determine the brightness distribution of the input image data for the image;
   a tone mapping curve generator circuit configured to generate a tone mapping curve based on the analyzed histogram describing the brightness distribution; and
   a brightness adjuster circuit configured to adjust the brightness of the transformed white sub-pixel data signal based on the generated tone mapping curve; and
   a display panel for displaying the image.

2. The display device of claim 1, wherein the brightness distribution determiner circuit is further configured to:
   divide color pixel data signals of the input image data for the image into N color pixel data signal groups based on a brightness of each color pixel data signal determined using the histogram describing brightness distribution, where N is at least two; and
   identify from the N color pixel data signal groups a maximum pixel data signal group including a largest number of color pixel data signals.

3. The display device of claim 2, wherein adjusting the brightness of the transformed white sub-pixel data signal comprises adjusting the brightness of a gray scale level range opposite to the maximum pixel data signal group based on the generated tone mapping curve.

4. The display device of claim 2, wherein the tone mapping curve generator circuit is further configured to generate the tone mapping curve based on the identified maximum pixel data signal group including the largest number of color pixel data signals.

5. The display device of claim 1, wherein the data conversion unit further comprises a red, green and blue (RGB) reinforcement circuit configured to selectively perform saturation reinforcement for transformed red sub-pixel data signal, green sub-pixel data signal, and blue sub-pixel data signal according to a color attribute pattern of the red sub-pixel data signal, green sub-pixel data signal, and blue sub-pixel data signal of input image data for the image, wherein the transformed red sub-pixel data signal, green sub-pixel data signal, and blue sub-pixel data signal are included in the transformed red sub-pixel data signal, green sub-pixel data signal, blue sub-pixel data signal, and white sub-pixel data signal.

6. The display device of claim 5, wherein the RGB reinforcement circuit comprises:
   a color attribute pattern analyzer circuit configured to analyze the color attribute pattern of the red sub-pixel data signal, green sub-pixel data signal, and blue sub-pixel data signal of input image data for the image;
   a saturation gain controller circuit configured to selectively generate saturation gain values based on the analyzed color attribute pattern; and
   a RGB adjuster circuit configured to adjust saturation of the transformed red sub-pixel data signal, green sub-pixel data signal, and blue sub-pixel data signal using the generated saturation gain values.

7. The display device of claim 6, wherein the saturation gain controller circuit comprises:
   a first saturation gain generator circuit configured to generate variable saturation gain values for the transformed red sub-pixel data signal, green sub-pixel data signal, and blue sub-pixel data signal responsive to the red sub-pixel data signal, green sub-pixel data signal, and blue sub-pixel data signal of input image data for the image corresponding to a chromatic color; and
   a second saturation gain generator circuit configured to generate fixed saturation gain values for the transformed red sub-pixel data signal, green sub-pixel data signal, and blue sub-pixel data signal responsive to the red sub-pixel data signal, green sub-pixel data signal, and blue sub-pixel data signal of input image data for the image corresponding to an achromatic color.

8. The display device of claim 7, wherein the variable saturation gain values are varied along gray scale values of the red sub-pixel data signal, green sub-pixel data signal, and blue sub-pixel data signal of the input image data for the image.

9. The display device of claim 5, wherein the data conversion unit further comprises a rendering circuit configured to combine the brightness-adjusted transformed white sub-pixel data signal and the saturation-reinforced transformed red sub-pixel data signal, green sub-pixel data signal, and blue sub-pixel data signal.

10. The display device of claim 1, wherein the data conversion unit further comprises a de-gamma circuit configured to perform a de-gamma treatment on the red sub-pixel data signal, green sub-pixel data signal, and blue sub-pixel data signal, the de-gamma treated red sub-pixel data signal, green sub-pixel data signal, and blue sub-pixel data signal transformed into the transformed red sub-pixel data signal, green sub-pixel data signal, blue sub-pixel data signal, and white sub-pixel data signal.

11. The display device of claim 1, wherein the transformed red sub-pixel data signal, green sub-pixel data signal, and blue sub-pixel data signal are not adjusted based on the brightness distribution of the input image data of the image, wherein the transformed red sub-pixel data signal, green sub-pixel data signal, and blue sub-pixel data signal are included in the transformed red sub-pixel data signal, green sub-pixel data signal, blue sub-pixel data signal, and white sub-pixel data signal.

12. The display device of claim 1, wherein the brightness reinforcement circuit is further configured to:
determine one of a plurality of histograms that corresponds to the analyzed histogram of the input image data, each of the plurality of histograms associated with a distinct tone mapping curve;
select a tone mapping curve associated with the determined one histogram from the plurality of histograms that corresponds to input image data and
adjust the brightness of the white sub-pixel data signal according to the selected tone mapping curve.

13. A method of operation in a display device, the method comprising:
transforming, by the display device, red sub-pixel, green sub-pixel, and blue sub-pixel data signals of input image data of an image into transformed red sub-pixel data signal, green sub-pixel data signal, blue sub-pixel data signal, and white sub-pixel data signal;
generating a histogram describing a brightness distribution of the input image data of the image using the red sub-pixel data signal, green sub-pixel data signal, and blue sub-pixel data signal;
analyzing, by the display device, the histogram describing the brightness distribution determined from the red sub-pixel data signal, green sub-pixel data signal, and blue sub-pixel data signal of the input image data of the image to divide color pixel data signals of the input image data of the image into N color pixel data signal groups based on a brightness of each color pixel data signal analyzed from the histogram, where N is at least two;
identifying, from the N color pixel data signal groups, a maximum color pixel data signal group including a largest number of color pixel data signals;
identifying a tone mapping curve based on the identified maximum color pixel data signal group;
adjusting, by the display device, brightness of a transformed white sub-pixel data signal based on the identified tone mapping curve, wherein the transformed white sub-pixel data signal is included in the transformed red sub-pixel data signal, green sub-pixel data signal, blue sub-pixel data signal, and white sub-pixel data signal; and
displaying the image by the display device.

14. The method of claim 12, further comprising:
analyzing a color attribute pattern of the red sub-pixel data signal, green sub-pixel data signal, and blue sub-pixel data signal of the input image data of the image;
setting saturation gain values based on the analyzed color attribute pattern; and
performing a saturation adjustment for transformed red sub-pixel data signal, green sub-pixel data signal, and blue sub-pixel data signal using the set saturation gain values, wherein the transformed red sub-pixel data signal, green sub-pixel data signal, and blue sub-pixel data signal are included in the transformed red sub-pixel data signal, green sub-pixel data signal, blue sub-pixel data signal, and white sub-pixel data signal.

15. The method of claim 14, wherein setting the saturation gain values comprises:
setting variable saturation gain values in response to determining based on the color attribute pattern that the red sub-pixel data signal, green sub-pixel data signal, and blue sub-pixel data signal of the input image data of the image correspond to a chromatic color; and
setting fixed saturation gain values in response to determining based on the color attribute pattern that the red sub-pixel data signal, green sub-pixel data signal, and blue sub-pixel data signal of the input image data of the image correspond to an achromatic color.

16. The method of claim 15, wherein the variable saturation gain values are varied along gray scale values of the red sub-pixel data signal, green sub-pixel data signal, and blue sub-pixel data signal of the input image data of the image.

17. The method of claim 14, further comprising combining the brightness-adjusted transformed white sub-pixel data signal and the saturation-adjusted transformed red sub-pixel data signal, green sub-pixel data signal, and blue sub-pixel data signal.

* * * * *